Figure 8:
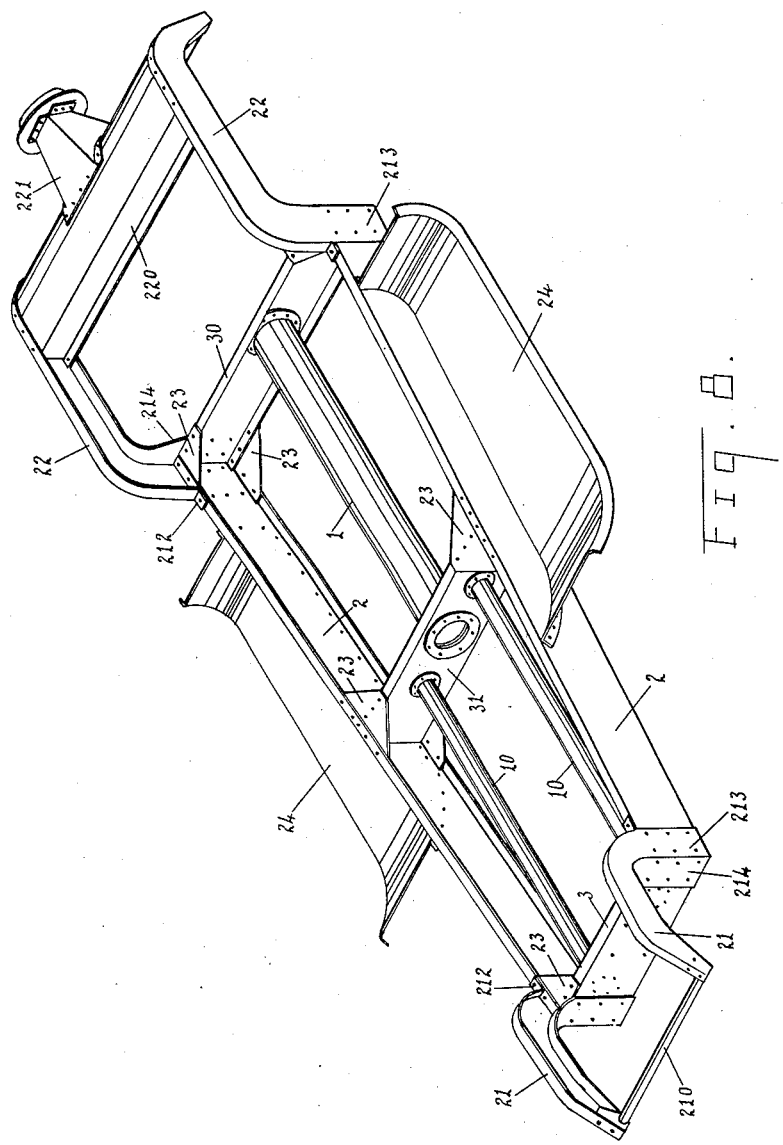

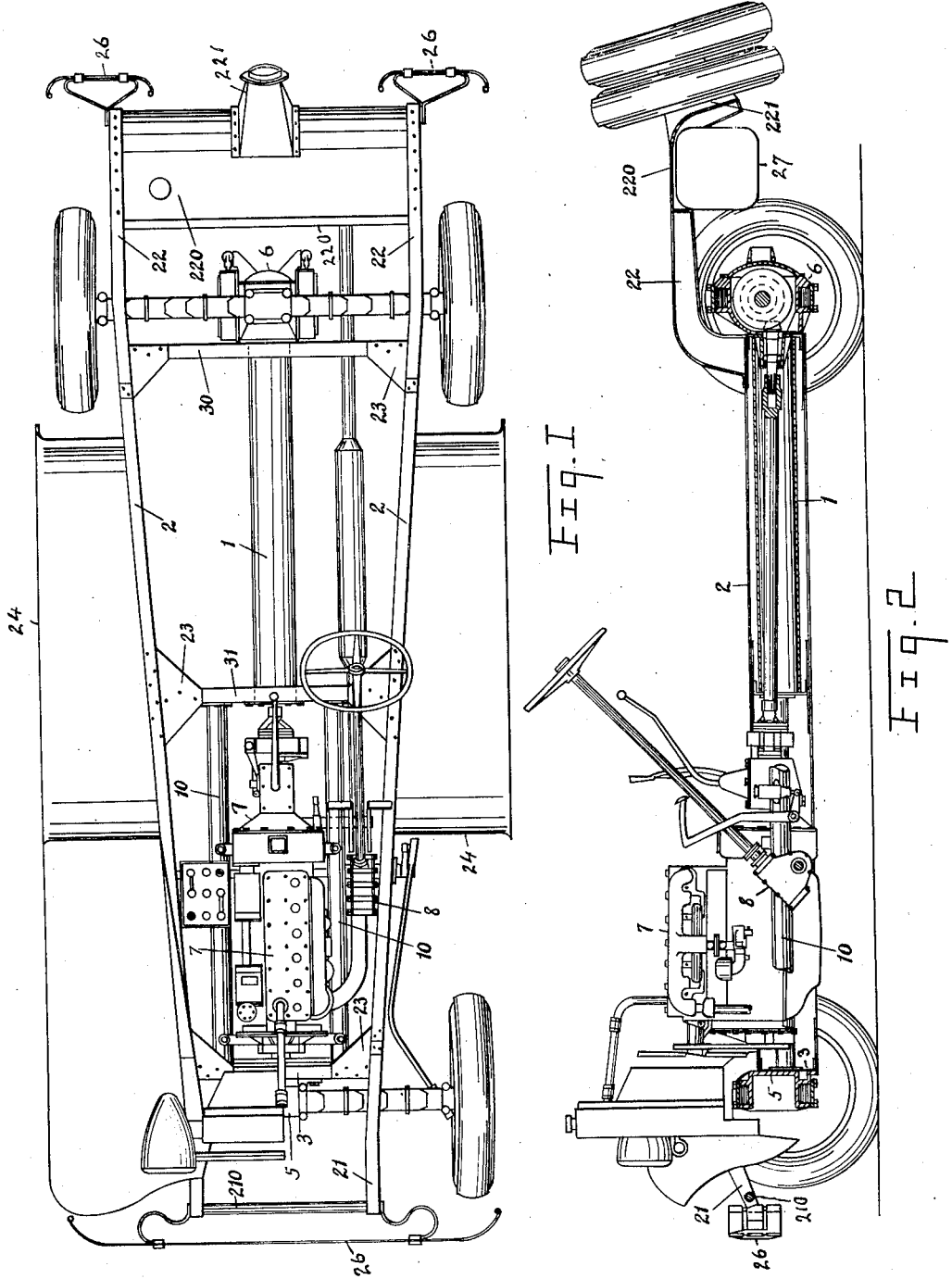

Jan. 1, 1929.  1,697,099
J. A. WRIGHT
MOTOR CHASSIS
Filed March 31, 1927   3 Sheets-Sheet 2
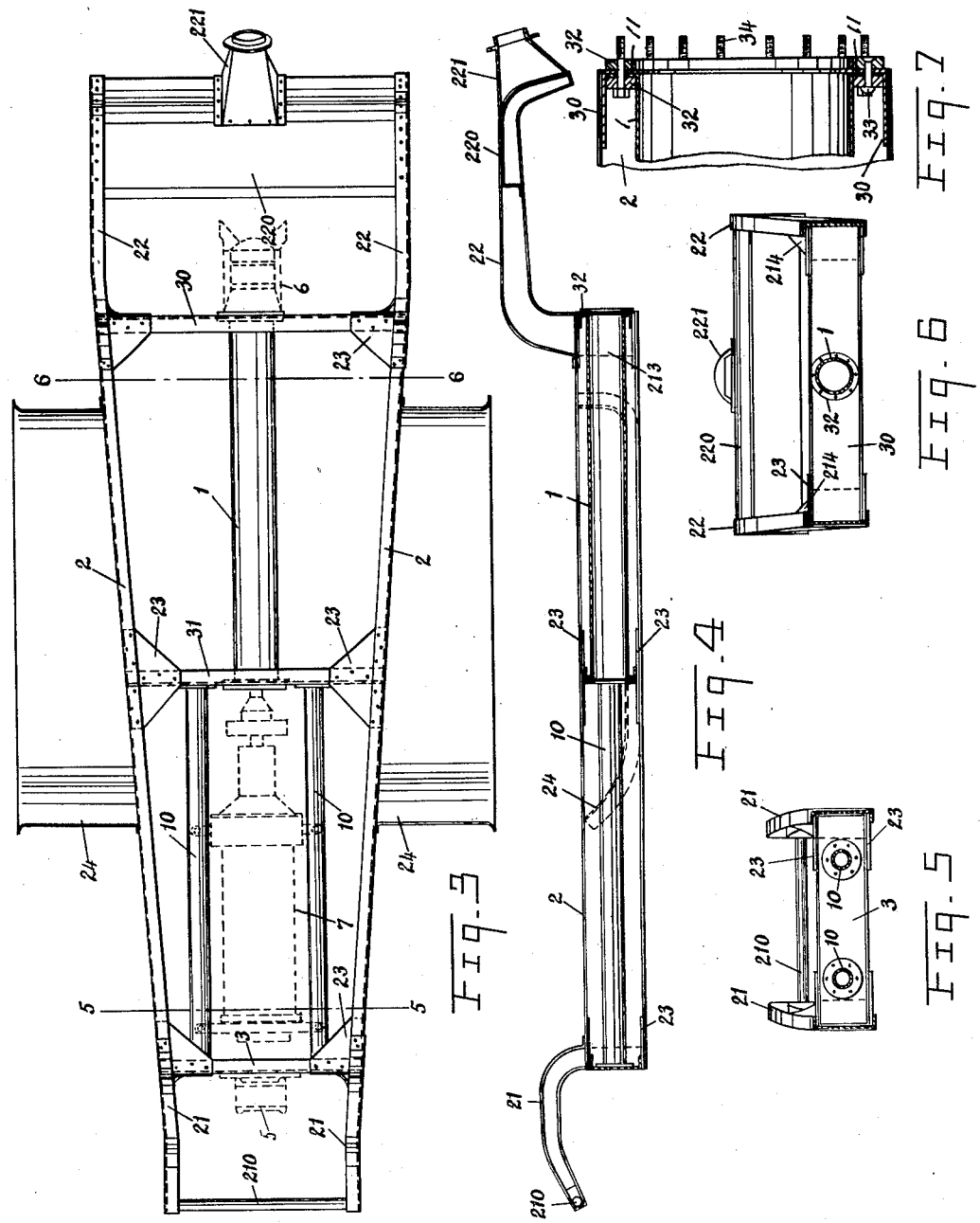
Inventor
James A. Wright.
By
Attorney Jan. 1, 1929.

J. A. WRIGHT 1,697,099

MOTOR CHASSIS

Filed March 31, 1927    3 Sheets-Sheet 3

INVENTOR.
JAMES A. WRIGHT.

By

ATTORNEY.

Patented Jan. 1, 1929.

1,697,099

UNITED STATES PATENT OFFICE.

JAMES A. WRIGHT, OF MONTREAL, QUEBEC, CANADA.

MOTOR CHASSIS.

Application filed March 31, 1927. Serial No. 179,992.

This invention relates to motor vehicle chassis, and particularly to those having independent wheel suspension.

The object of this invention is to provide a motor chassis having a frame of simple and economical construction, light in weight, with great rigidity and resistance to torsional or other stresses.

A further object is to provide a chassis frame comprising a rigid main frame extending between the front and rear spring yoke blocks, and front and rear sub-frames extending from the main frame over the yoke blocks.

A further object is to provide a main frame comprising side and cross channelled members and tubular members between the cross members.

A further object is to provide an improved power plant mounting.

A further object is to provide an improved tank mounting and spare wheel support.

Further objects will be set forth hereinafter.

The invention consists of a chassis entirely supported on a main frame between the front and rear yoke blocks in which the transverse spring suspension is mounted. This frame forms a rigid unit having channelled side members, end cross members, an intermediate cross member, a main central torque tube between the intermediate and rear cross members and a pair of parallel torque tubes between the front and intermediate cross members, on which the power plant is supported.

A front sub-frame with arched sides, is secured to the front end of the main frame, and supports the radiator.

A rear sub-frame with off set sides secured to the rear end of the main frame, is connected by a downwardly curved cross plate providing a tank support and cover, with a spare wheel bracket projecting therefrom.

The sub-frames also support the front and rear bumpers.

The running boards and mudguards are mounted on the side members and sub-frame sides.

The steering gear is secured to one of the tubes and the steering rod is journalled in brackets on the main frame. The cross members are gusseted to the side members above and below.

Reference is made to the accompanying drawings in which—

Fig. 1 is a plan view.
Fig. 2 is a vertical longitudinal section.
Fig. 3 is a plan view of the frame and sub-frame.
Fig. 4 is a vertical central section.
Fig. 5 is a vertical cross section on the line 5—5 of Fig. 3 looking forward.
Fig. 6 is a vertical cross section on the line 6—6 of Fig. 3 looking backward.
Fig. 7 is an enlarged vertical section on the line 7—7 of Fig. 3.
Fig. 8 is a perspective view of the assembly of the sub-frames with the main frame.

The main frame of the chassis is composed of channelled side members 2, connected at both ends by cross members 3, and 30, and by an intermediate cross member 31. The upper and lower flanges are secured by gussets 23, at the connections.

A large torque tube 1, with outwardly flanged ends 11, extends centrally between circular openings in the rear and intermediate cross members 30 and 31. The flanged ends 11, of the tube 1, are riveted to the cross members 30 and 31 through rings 32, by rivets 33, as shown in Fig. 7.

Between the front and intermediate cross members, a pair of smaller tubes 10, 10, with flanged ends are secured to such cross members, parallel and equidistant from the center line of the chassis. The whole forming a main frame of simple, economical and although comparatively light, of very rigid construction.

The running boards 24, 24, riveted to the side members 2, add stiffening to them.

This frame supports the entire operative mechanism and is secured to the front spring yoke block 5, at one end, and to the differential casing 6, which forms the rear spring yoke block, by screw bolts 34, shown in Fig. 7.

To the front end of the frame a sub-frame 21, comprising channelled arched sides and one or more cross members 210, is securely riveted by means of the shaped ends 212, 213 and 214, as shown in Fig. 8, forming a forwardly projecting bracket support on which are mounted the radiator and the front bumper 26.

To the rear end of the frame a similar sub-frame 22 is secured in like manner. This sub-frame 22, comprises side members connected by a downwardly curved cross plate 220 beneath which the tank 27, is mounted and on which is a rearwardly projecting bracket 221, to carry spare wheels. The sub-frame also carries the rear bumpers 26.

The power plant 7, is mounted on the parallel tubes 10, 10, and adds stiffening to the front portion of the frame.

The steering gear and rod 8, mounted between the side members 2, of the frame and the tube 10, providing a very rigid support.

Although a special form of wheel suspension by transverse springs is shown in Figs. 1 and 2, this particular form does not in any way limit the invention and does not come within the subject matter of this application.

Other arrangements of transverse spring suspension are equally applicable to the chassis assembly as shown and described.

The frame is also adaptable to the conventional spring suspension having longitudinal springs, with slight modifications in the differential connections to the driving shaft.

With a construction of this general form, the chassis is provided with a frame short in length but of great strength and rigidity. As the various parts are practically all stampings, their fabrication and assembly is simple and economical.

The composite frame structure with its front and rear sub-frames provides support for the entire load of the chassis and body on the main frame, from which it is transferred directly to the springs mounted on the yoke blocks.

This main frame which is suspended on the spring bearing yoke blocks at the center of the chassis, transfers the load to the springs only in that center.

The torque tubes prevent any torsional stresses from affecting the stability of the chassis and road shocks are not transmitted to the sides of the frame and vibration is eliminated from the car body.

The power plant mounted on the parallel tubes forms part of the main frame and provides a very secure and rigid central section.

The mounting of the steering gear between the side member and one of the small tubes provides a firm setting free from vibration.

The curved cross plate of the rear sub-frame houses the tank and provides a luggage support as well as a spare wheel carrier and adds a stiff connection between the sides of the sub-frame at the rear end where the bumpers are attached.

What I claim is:—

1. In a motor chassis, a main frame comprising channeled side members, cross members, with a central tube at the rear end and parallel tubes at the front end, connecting the cross members, an arched sub-frame secured to the front end of the main frame and an arched sub-frame secured to the rear end of the main frame, with cross members to each sub-frame.

2. In a motor chassis, a main frame comprising channelled side members, cross members, with torque tubes connecting the cross members, secured centrally to the yoke blocks on which the front and rear spring suspensions are mounted.

3. In a motor chassis, a main frame comprising channelled side members, cross members, with torque tubes connecting the cross members, a single large tube centrally at the rear end and parallel small tubes supporting the power plant between them at the front end, secured to yoke blocks on which the spring suspensions are mounted.

4. In a motor chassis, a main frame comprising channelled side members, cross members, with torque tubes connecting the cross members, a single large tube centrally at the rear end and parallel small tubes supporting the power plant between them at the front end, secured to yoke blocks on which the spring suspensions are mounted, at the front end between the tubes and at the rear end around the end of the large tube.

5. In a motor chassis, a main frame comprising channelled side members, connected by cross members, supported on the front and rear yoke blocks, and sub-frames extending forwardly and rearwardly from the ends of the main frame.

JAMES A. WRIGHT.